United States Patent [19]

Dailey et al.

[11] 4,379,243

[45] Apr. 5, 1983

[54] STATOR END TURN SUPPORT SYSTEM

[75] Inventors: George F. Dailey, Plum; Charles R. Ruffing, Edgewood Borough; Leonard B. Simmonds, Monroeville, all of Pa.

[73] Assignee: Westinghouse Electric Corp., Pittsburgh, Pa.

[21] Appl. No.: 317,099

[22] Filed: Nov. 2, 1981

[51] Int. Cl.³ .............................................. H02K 3/46
[52] U.S. Cl. ...................................... 310/260; 310/45; 310/271
[58] Field of Search ................. 310/260, 270, 271, 91, 310/194, 45; 336/231

[56] References Cited

U.S. PATENT DOCUMENTS

| Re. 28,478 | 7/1975 | Bahn | 310/260 |
|---|---|---|---|
| 3,866,073 | 2/1975 | Gjaja | 310/260 |
| 3,942,057 | 3/1976 | Philofsky | 310/271 |
| 3,975,655 | 8/1976 | Beermann et al. | 310/260 |
| 3,988,625 | 10/1976 | Jager | 310/260 |
| 3,991,334 | 11/1976 | Cooper | 310/260 |
| 4,126,799 | 11/1978 | Iogansen et al. | 310/260 |
| 4,238,339 | 12/1980 | Khutoresky | 310/260 |

FOREIGN PATENT DOCUMENTS 943606 3/1974 Canada .............................. 310/260

Primary Examiner—R. Skudy
Attorney, Agent, or Firm—William D. Lanyi

[57] ABSTRACT

An end turn support structure is disclosed which permits it to be constructed with varying, preselected coefficients of expansion along its length. This characteristic allows it to expand in a similar manner to the end turns which it supports. This structure also comprises conformable members and external support apparatus that provide a means for firmly attaching the end turns to the support structure and the support structure to the stator frame.

20 Claims, 9 Drawing Figures

STATOR END TURN SUPPORT SYSTEM

BACKGROUND OF THE INVENTION

The present invention relates generally to the mechanical support of electrical conductors of dynamoelectric machines and, more specifically, to the mechanical support of the end turns of electrical generator stator coils.

Dynamoelectric machines in general, and turbine generators in particular, utilize stator coils which are disposed within axial slots in an associated stator core. These coils extend axially from the core to form end turns where intercoil connections are made which determine the electrical phase associations of the coil assembly. In this end turn region the coils extend from the stator core in both the axial and radial direction in such a way so as to form a conductor configuration in the general shape of a frustum of a cone.

Since the end turns are not supported along their entire length by the core, a means of mechanical support must be provided. It is desirable to firmly attach the end turns to this support apparatus in order to constrain the movement of the end turns and to minimize vibration. However, since the coil end turns are subjected to elevated temperatures, they expand along their length in a direction away from both the stator core's axial end and the core's central axis. Since the straight portion of each coil is essentially constrained in a slot of the stator core, the resulting expansion movement of each segment of the end turn is a function of not only its thermal expansion but that of all other segments between it and the stator core. In other words, the resulting amount of movement of a particular segment of a coil is cumulative and in a direction away from the stator core.

The end turn support means, itself, is also subjected to elevated temperatures and will expand as a dual function of the temperature and its coefficient of thermal expansion. If the support means is fixed at some point, it will experience a similar cumulative expansion with the movement of any point on the support being a function of the distance of that point from the point at which the support means is fixed.

It should be apparent that if the coefficients of thermal expansion of the end turn assembly and the support means are significantly different, relative motion between them can occur. If the end turn assembly and its support means are fastened together in a rigid manner, this relative movement can create stresses in the components and possibly lead to fractures in either the coil insulation or support structure.

SUMMARY OF THE INVENTION

It is the general object of the present invention to provide a support mechanism for the end turn section of a stator coil assembly.

A further objective is to provide a coil end turn support apparatus that minimizes relative motion between it and the supported end turn section.

A further objective is to provide an end turn support device which will avoid harmful effects to itself or the end turns if small relative motion between the support device and end turn section occurs.

The present invention utilizes a filament wound conical end turn support which is disposed radially outward from the coil end turn section of a stator coil assembly of a dynamoelectric machine. The conical support is wound in such a way that the individual filaments vary in their winding pitch around it. By varying the pitch, the effective coefficient of thermal expansion and modulus of elasticity of the conical support can be varied along its axial length. This variation can be controlled in such a way as to cause the conical support to have coefficients of thermal expansion along its axial length that are similar to those of the end turns which it supports.

The conical support is further provided with conformable devices between it and the end turns to assure a reliable connection between them. Also, a thin strain isolator is disposed between the conformable devices and their adjacent end turns to provide for any small amount of movement between these members in the support arrangement of the present invention.

The conical support device is further supported by brackets which are disposed radially outward from it. The brackets can be fastened to the conical support by radially extending nonmagnetic bolts.

BRIEF DESCRIPTION OF THE DRAWINGS

The present invention will be more clearly understood by reading the following description of the preferred embodiments along with the figures, in which.

DESCRIPTION OF THE PREFERRED EMBODIMENT

The present invention relates to the mechanical support of the end turns of an electrical generator stator coil assembly.

Figure 1:
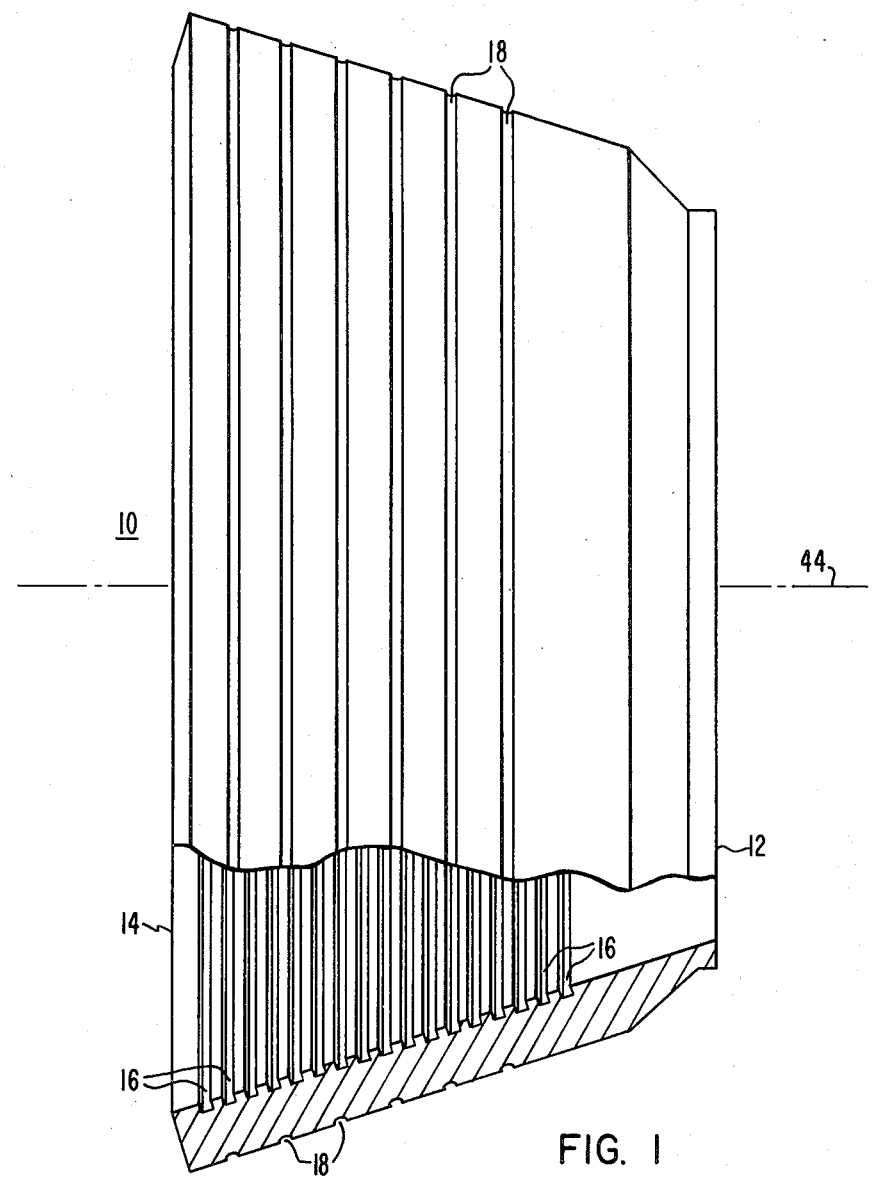
FIG. 1 shows the conical support member of the present invention.

The present invention comprises a conical support member as shown in FIG. 1. This cone 10 is a filament wound member which comprises glass filaments embedded in a matrix of resin and is formed in the shape of a frustum of a cone. The cone 10 has a small axial end 12 and a larger axial end 14. The inside surface of the cone 10 has a plurality of circumferentially running grooves 16 therein. These grooves 16, which will be described in greater detail below, provide a means for the end turns of a generator stator winding to be securely fastened to the inside surface of the cone 10. On the outside surface of the cone 10 are a plurality of circumferentially running grooves 18. These outer grooves 18 provide a means for securely fastening the cone 10 to associated support members disposed radially outward from it.

The cone 10 is disposed radially outward from the end turns of the stator winding assembly. In a typical dynamoelectric machine the stator coils extend from the stator core in both the axial, circumferential and radical directions, forming an end turn coil basket which has the shape of a frustum of a cone. The inside surface of the support cone 10 is shaped at angle such that its inner surface is parallel to the outer end turn coils. For reasons which will be described in greater detail below, it is desirable that the cone 10 has a different coefficient of thermal expansion at its axially inboard end 12 than at its axially outboard end 14. The present invention makes it possible to provide this varying coefficient of thermal expansion in a preselected manner.

Figure 2:
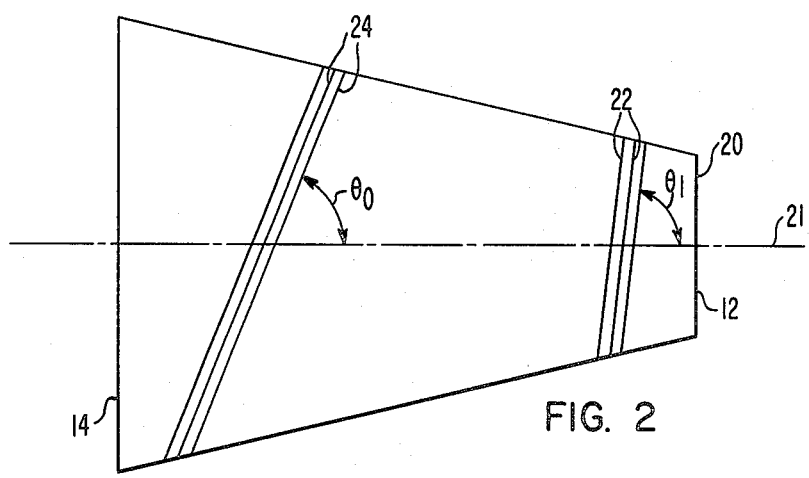
FIG. 2 schematically illustrates the variable winding angles of the present invention.

FIG. 2 schematically depicts a filament wound cone 20. It should be understood that the cone 20 of FIG. 2 is a schematic representation of the cone of the present invention (reference numeral 10 in FIGS. 1, 4, 7 and 8) during its initial winding operation prior to the forming of the grooves (reference numerals 16 and 18 in FIGS. 1 and 4 and reference numeral 18 in FIGS. 7 and 8) and other specific variations (reference numerals 57 and 62 in FIG. 7 and reference numeral 92 in FIG. 8) in its surfaces. As should be obvious to one skilled in the art, the effective coefficient of thermal expansion of the cone 20, shown in FIG. 2, is dependent upon the coefficient of thermal expansion of the glass filaments, 22 or 24, and the coefficient of thermal expansion of the resin matrix of the cone along with the ratio by weight of glass filaments to resin. However, it should also be apparent that the coefficient of thermal expansion in both the axial or circumferential direction is also dependent on the angle of the glass filaments to the central axis 21 of the cone. FIG. 2 shows the glass filaments 22 at the smaller end 12 of the cone to be wound at an angle $\theta_I$ and the glass filaments 24 at the larger end 14 of the cone to be wound at an angle $\theta_O$ to the center of rotation of the cone 20. For any angle $\theta$, the component of the coefficient of thermal expansion of the glass filament, 22 or 24, which is attributed in either the axial or circumferential direction is dependent upon the magnitude of angle $\theta$. For a small angle $\theta$, the axial component of this coefficient will more closely resemble the coefficient of thermal expansion of the glass filament itself. For large angles of $\theta$, the circumferential component of this coefficient will more closely resemble the coefficient of the glass filament itself. As can be seen in FIG. 2, the glass filaments 22 which are located near the small end 12 of the cone 20 are wound at a larger angle $\theta_I$ than the glass filaments 32 which are closer to the large end 14 of the cone 20. The effect of these different angles is that, based on a given coefficient of thermal expansion of the glass fibers, its axial component will be larger at the small end 12 than at the large end 14. In contradistinction, the coefficient of thermal expansion in the circumferential direction will be smaller at the small end 12 than at the large end 14. It should be obvious, in view of FIG. 2 and the above discussion, that the coefficients of thermal expansion of a member such as the cone 20 can be varied along its length depending on the winding angle, $\theta_I$ or $\theta_O$, of the glass filaments, 22 or 24, respectively.

Figure 3A:
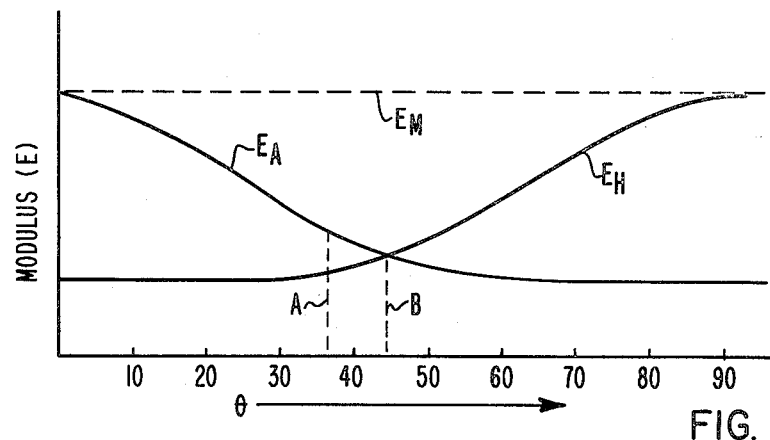
FIG. 3a shows the relationships of axial and hoop moduli of elasticity of the present invention as a function of winding angle.
Figure 3B:
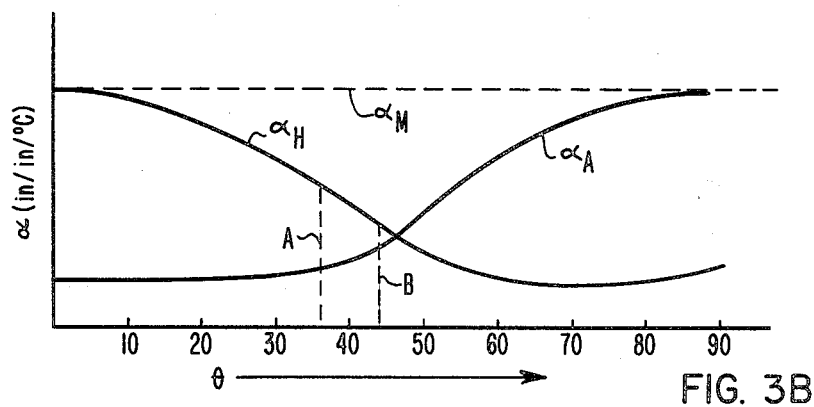
FIG. 3b shows the relationship of axial and hoop coefficients of thermal expansion of the present invention as a function of winding angle.

FIGS. 3A and 3B illustrate the relationship between both the modulus of elasticity, E, and the coefficient of thermal expansion, $\alpha$, to the winding angle $\theta$. FIG. 3A shows that at a winding angle of zero degrees the modulus of elasticity in the axial direction $E_A$ is essentially the same as that of the glass filament. This maximum value is illustrated by the horizontal dotted line $E_M$ which represents the modulus of elasticity of the glass filaments and therefore the maximum effective component of this modulus in any direction. As the angle $\theta$ is increased it should be apparent from FIG. 3A that the effective modulus of elasticity in the axial direction $E_A$ is decreased. Similarly, as angle $\theta$ increases, the modulus of elasticity in the circumferential or hoop direction $E_H$ increases. Of course, it should be noted that the results shown in FIG. 3A are the result of empirical studies and depend to a great extent on the ratio of glass filaments to resin matrix in the cone. FIG. 3B illustrates a similar curve for the coefficients of thermal expansion, $\alpha$, in both the hoop, $\alpha_H$, and the axial, $\alpha_A$, directions. It should be obvious from FIGS. 3A and 3B that, by properly selecting the winding angles, the coefficients of thermal expansion and the moduli of elasticity can be varied and optimized for any given situation.

As described above, the end turn section of a stator coil assembly typically extends from its associated stator core in both the axial and radial directions to form an end turn configuration which is generally in the shape of a frustum of a cone. The end turns also extend circumferentially within this configuration along an involute path. The resulting complex shape of each end turn coil causes it to have different resultant axial and hoop coefficients of thermal expansion along its length. Although the thermal properties of each individual coil are substantially uniform along its length, the composite end turn structure contains other components such as spacers which affect its thermal properties. Also, the complex shapes of the individual coils result in continuously changing angles between the coils and the center line of the subject dynamoelectric machine which cause the effective axial and radial components of these properties to vary along its axial and radial dimensions.

Typical values of these coefficients of thermal expansion, for illustrative purposes, are discussed below. Within the core slot, a stator coil can typically have a coefficient of thermal expansion, $\alpha$, of $13 \times 10^{-6}$ in/in/°C. This value is a result of both the combination of materials within the coil and the fact that the coil's conductors are transposed within its straight section. At the point where the coil exits from the core, its coefficient can be approximately $17 \times 10^{-6}$ in/in/°C. in the axial direction. Further along the same coil, where it traverses an involute path in the axial, radial and circumferential directions, the coil basket's coefficient of thermal expansion in the axial direction can approach values greater than $20 \times 10^{-6}$ in/in/°C. Although different coil configurations will result in different axial coefficients, this illustrative example should make it apparent that the end turns will have axial coefficients of thermal expansion that vary significantly along their length. It should also be apparent to one skilled in the art that the end turn's coefficient of thermal expansion in the radial direction will also vary along its length for similar reasons.

In the example discussed above, it would obviously be desirable to support the end turn assembly with a structure whose coefficients of thermal expansion exactly correspond to those of its adjacent end turns, point for point, along the respective lengths. However, it should also be obvious that the support structure must also have moduli of elasticity that are within proper design criteria for the apparatus. Therefore, the relationships between the coefficients of thermal expansion, moduli of elasticity and winding angle, as shown in FIGS. 3A and 3B, must be considered when determining the winding angles to be used in producing the conical support structure of the present invention.

The two angles represented by lines A and B in FIGS. 3A and 3B can therefore be chosen to satisfy both the expansion and strength characteristics described above. Typically angles (which correspond to $\theta_I$ and $\theta_O$ in FIG. 2) are chosen that represent an acceptable compromise between the two conflicting design criteria, expansion and elasticity. For example, as depicted in FIGS. 3A and 3B, line A represents an angle $\theta_O$ of approximately 37 degrees and line B represents an angle $\theta_I$ of approximately 44 degrees. These values, in this particular application, result in the optimum coefficients of thermal expansion which, in their corresponding moduli of elasticity, are within engineering design limitations.

It should be understood that, although FIG. 2 depicts only two winding angles, $\theta_O$ and $\theta_I$, the cone 20 can be wound in a manner that results in a continuously changing angle between the two axial ends of the cone 20. This would cause the cone to have a gradually increasing axial coefficient of thermal expansion between ends 12 and 14 (as shown in FIG. 2).

Figure 4:
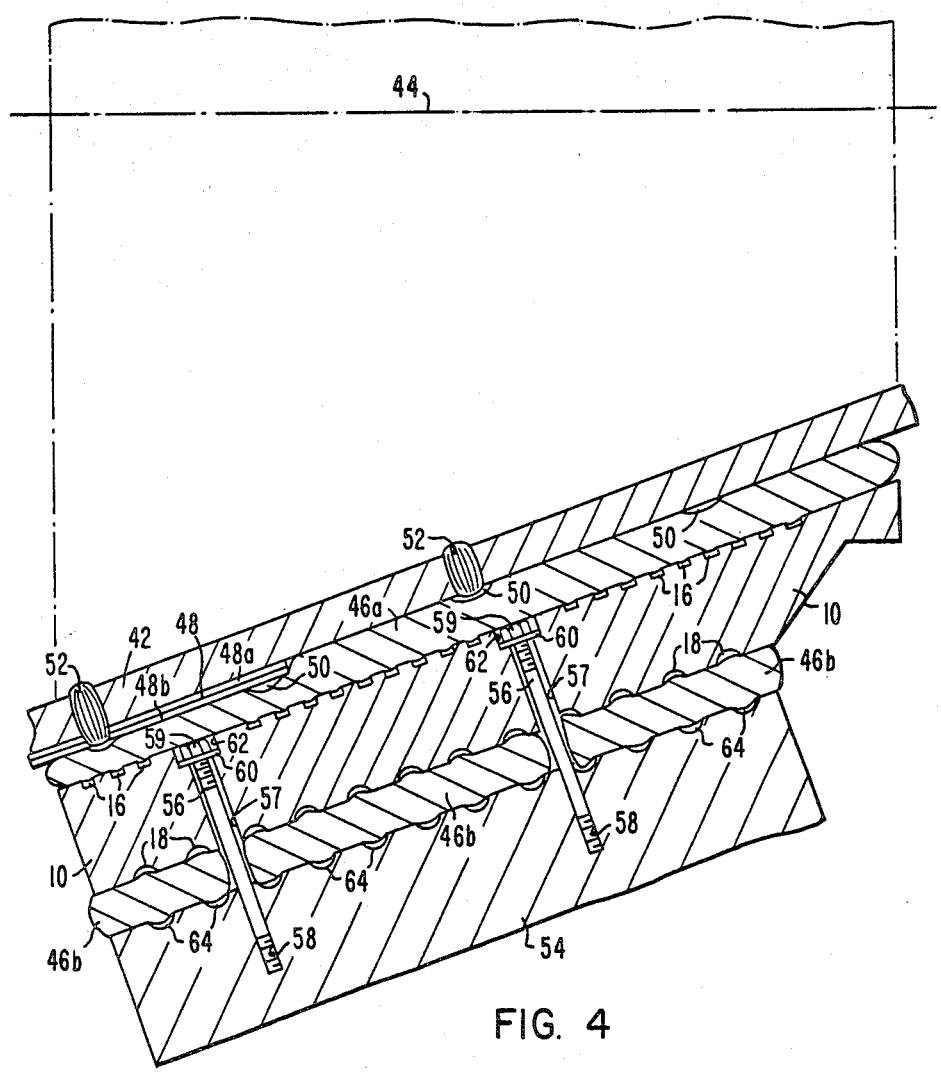
FIG. 4 depicts the present invention applied to an end turn of a dynamoelectric machine.

FIG. 4 depicts the conical support member 10 associated with one end turn 42 of a stator coil assembly. It should be understood that, although in the section view of FIG. 4 only one end turn 42 is illustrated, the conical support member 10 provides mechanical support for a plurality of end turns which are arranged in a conical configuration about the central axis 44 of the stator coil assembly.

A conformable member 46a is disposed between the end turn 42 and the radially inward surface of the conical support member 10. This conformable member 46a, which is described in significantly greater detail below, provides a means for firmly connecting the end turn 42 to the conical support member 10. It adheres strongly to both the end turn 42 and conical support member 10. This adherence is enhanced both by its conformability to adjacent surfaces and the grooves 16 in the inner surface of the conical support member. The conformable member 46a is disposed along the radially outward surface of the end turn 42 substantially along its surface which is parallel to and proximate the inner surface of the conical support member 10.

Betwen the end turns 42 and conformable member 46a, a strain isolator 48 is disposed for a portion of this coplanar distance. This strain isolator 48 comprises two layers, one of rubber 48a and one of dacron cloth 48b. The rubber layer 48a is bonded to the end turn 42 and the dacron cloth layer 48b is bonded to the conformable member 46a. The strain isolator 48 is disposed toward the axially outboard portion of the end turn 42 where the relative movement between the end turn 42 and the conical support member 10, as described above, is potentially most severe. In the event that relative movement occurs between these two components, the strain isolator 48 maintains a firm connection between them while also permitting a small amount of relative motion in the shear direction.

Along the radially inward surface of the conformable member 46a, a plurality of voids 50 are provided. These voids 50 run in a generally circumferential direction between the conformable member 46a and its radially inward adjacent component which may be either the end turn 42 or the strain isolator 48. The purpose of these voids 50 is to allow banding ties 52 to be passed around the end turn 42. These banding ties 52 are used to fasten one end turn 42 to another to provide for a more rigid end turn assembly. These voids 50 can be created by inserting a sacrificial device, which will not adhere to either of its adjacent surfaces, between the conformable member 46 and its adjacent components and removing it after the resin components of the conformable member 46a have hardened. These sacrificial device can be made of any suitable material, with plastic being an acceptable choice.

Disposed radially outward from the conical support member 10 is at least one support apparatus 54. This support apparatus 54 can be made from a flat plate of nonmagnetic material or any other suitable shape that allows it to fasten the conical support member to the main structure of the dynamoelectric machine. The precise means by which the support apparatus 54 is fastened to the main structure is not critical to the present invention and is not shown in FIG. 4.

The support apparatus 54 is fastened to the conical support member 10 by one or more nonmagnetic bolts 56 which pass radially through the conical support member 10 and into the support apparatus 54. Alternate bolting configurations are described in greater detail below, but FIG. 4 shows the bolt 56 passing through a clearance hole 57 in the conical support device 10 and threading into a hole 58 in the support apparatus 54. The radially inward end of the bolt 56 is associated with a nut 59 and a washer 60 which are disposed in a recess 62 which can be a counterbored hole.

Between the outer surface of the conical support member 10 and the support apparatus 54, one or more conformable members 46a are disposed to assure a secure connection between these components. This conformable member 46b is similar in structure and function to the conformable member 46a which was described above. Both of these components, 46a and 46b, will be described in more precise structural detail below.

In order to provide a strong connection between the conformable member 46b and its adjacent components, the outer surface of the conical support member 10 has a plurality of grooves 18 in it and the radially inner surface of the support apparatus 54 has a plurality of grooves 64 in it.

Figure 5:
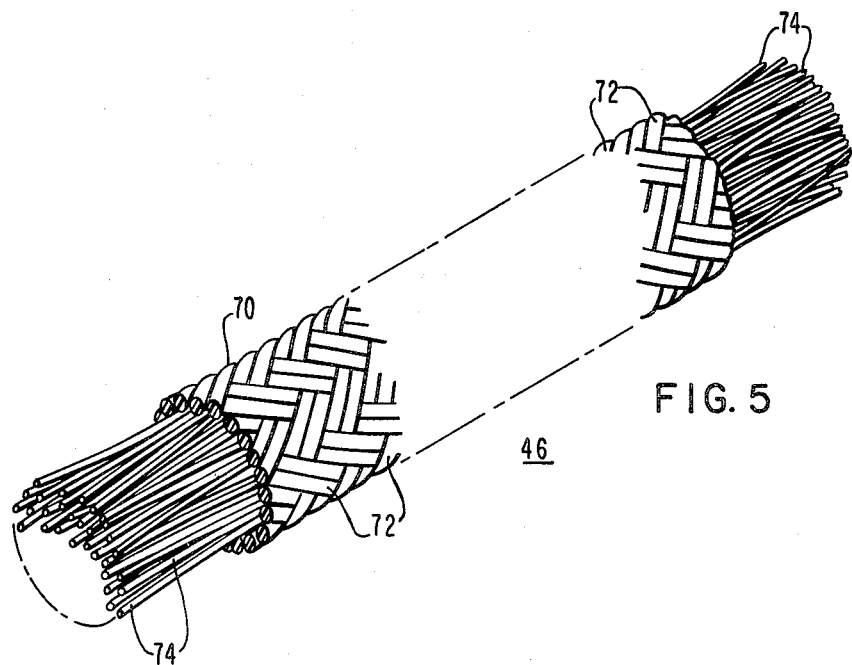
FIG. 5 illustrates the conformable member of the present invention.

FIG. 5 illustrates the conformable member 46 which is discussed above and appears in FIG. 4 (reference numerals 46a and 46b). The conformable member 46 comprises a hollow, coursely woven rope 70 made of dacron fibers 72. A plurality of cords 74 are disposed within the central cavity of the rope 70 and the entire configuration is impregnated with a resin which is capable of being cured at room temperature. This configuration can be made by absorbing a quantity of resin in a bundle of the cords 74, inserting the cords 74 into the rope 70 and then absorbing a further quantity of resin into the rope 70 itself. This procedure produces a conformable member 46 which can then be placed between any two adjacent components and allowed to cure at room temperature. This results in a firm bond between the two associated components with sufficient surface-to-surface contact between the conformable member 46 and each of the two components to assure proper adherence.

It has been found that by properly choosing the proportions of rope 70, resin and cords 74, the resulting coefficient of thermal expansion of the conformable member 46 can be preselected with considerable accuracy to conform to that of its adjacent components. Each cord 74 can be made from a combination of glass and dacron fibers to further allow preselection of the expansion and strength characteristics of the conformable member 46.

Figure 6:
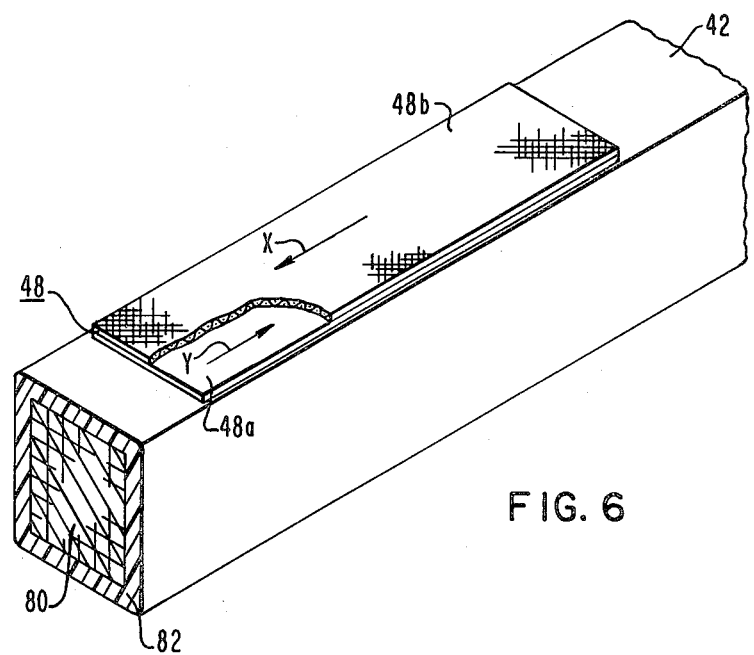
FIG. 6 illustrates the strain isolation of the present invention.

FIG. 6 shows the strain isolator 48, discussed above, in greater detail. The strain isolator 48 is attached to the end turn 42 on its radially outward surface which will be proximate the conical support member (reference numeral 10 of FIGS. 1 and 4) and in contact with the conformable member (reference numeral 46a in FIG. 4). It comprises a rubber layer 48a which is firmly attached to the end turn (reference numeral 42 of FIG. 4) and a dacron cloth layer 48b which will be firmly attached to the conformable member (reference numeral 46a in FIG. 4). As discussed above, a slight amount of relative motion can occur in this region due to both the cumulative effect of the end turn's expansion and slight differences between the coefficients of thermal expansion of these adjacent components. The strain isolator 48 absorbs this motion and prevents deleterious affects on either the end turn (reference numeral 42 of FIG. 4) or the adjacent conformable member. The strain isolator 48 reacts to this relative motion, illustrated by arrows X and Y, by deforming while maintaining its structural integrity. The rubber 48a and dacron cloth 48b layers maintain their contact to each other and to their adjacent components while deforming slightly to absorb the relative movement between the end turn (reference numeral 42 of FIG. 4) which is bonded to the rubber layer 48a and the conformable member which is bonded to the dacron cloth layer 48b. Also shown in FIG. 6 are the conductive members 80 of the coil 42 along with their surrounding insulation 82.

Figure 7:
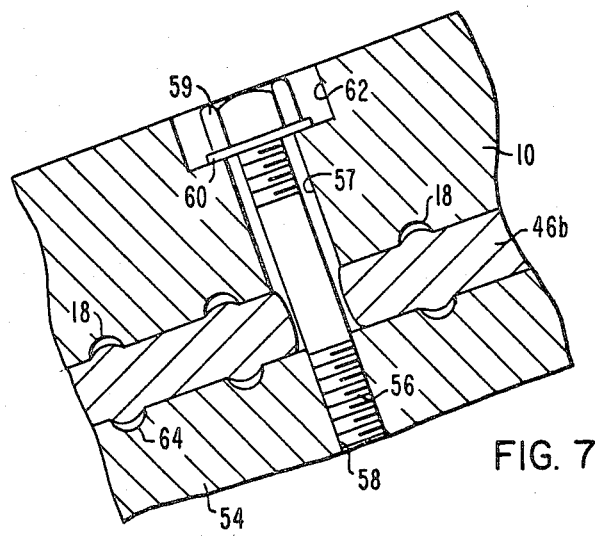
FIG. 7 is a section view of one alternate embodiment of the bolting configuration of the present invention.

FIG. 7 is a section view of the bolting configuration shown in FIG. 4. It shows the nonmagnetic bolt 56 passing through a clearance hole 57 in the conical support member 10 and into a threaded hole 58 in the support apparatus 54. The radially inward end of the bolt 56 is threaded into a nut 59 which confines a washer 60. Both the nut 59 and washer 60 are disposed in a recess 62 which can be a counterbored hole. A conformable member 46b is disposed between the conical support member 10 and the support apparatus 54. Both of these components are grooved (reference numerals 18 and 64) to assure a firm mechanical attachment to the conformable member 46b.

Figure 8:
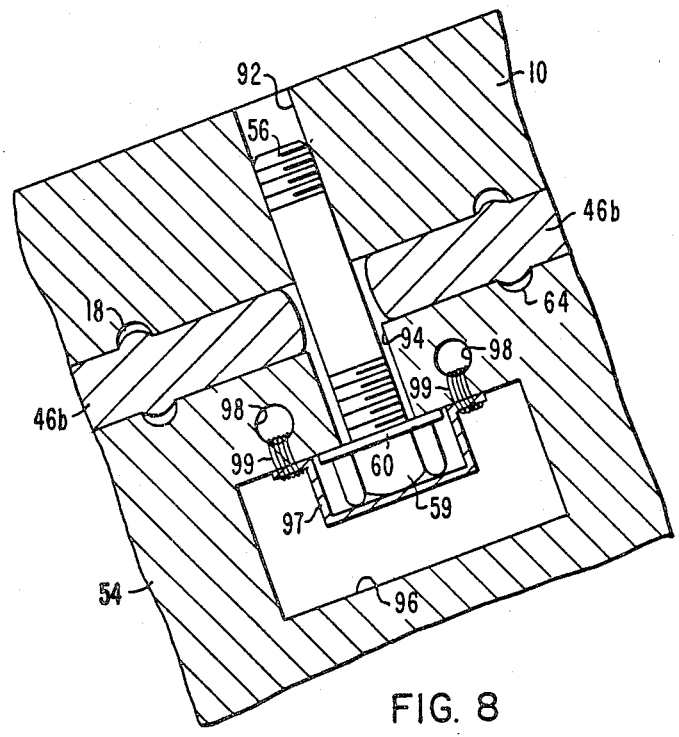
FIG. 8 is a section view of an alternate embodiment of the bolting configuration to the one shown in FIG. 7.

FIG. 8 depicts an alternate embodiment to that shown in FIG. 7. In FIG. 8, the nonmagnetic bolt 56 is inserted into a threaded hole 92 in the conical support member 10 and passes through a clearance hole 94 in the support apparatus 54 into a recess 96. A nut 59 is threaded onto the bolt 56 over a washer 60 and a generally U-shaped retainer 97 is disposed over the nut 59 as shown. The nut 59, washer 60 and retainer 97 are all disposed within the recess 96. In order to assure that the retainer 97 remains immobile, cords 99 are looped through holes 98 and around the legs of the retainer.

It should be understood that the retainer 97 and cords 99 of FIG. 8 serve to prevent the nut 59 and washer 60 from loosening and becoming free to move within the subject dynamoelectric machine and are not a requirement in the embodiment shown in FIGS. 4 or 7 because the nut 59 and washer 60 are contained within the recess 62 by the presence of the conformable member which is disposed on top of them.

It should be apparent to one skilled in the art that the present invention discloses a support structure for stator end turns of dynamoelectric machines which allows the expansion characteristics of the end turns to be closely matched by the preselected expansion characteristics of the support structure. It should further be apparent that the present invention also provides a means to prevent damage to the support structure due to slight relative movement between components.

Although the present invention has been described in considerable detail, it should be understood that the present invention is not to be so limited and that other embodiments are within the scope thereof.

What we claim is:

1. A system for supporting end turns of a plurality of cylindrically configured stator coils, said system comprising:
   a first support member, said first support member being nonmagnetic, nonconducting and generally rigid, said first support member having a bore therethrough, said first support member having the shape of a frustum of a cone and having an inside surface, said end turns being disposed proximate and generally parallel to said inside surface, said first support member having a central axis and a first and a second axial end, said first support member being a filament wound structure with the filament wound about said first support member in a spiral helix manner, said filament being wound at a first preselected angle in the region of said first axial end and at a second preselected angle in the region of said second axial end, said inner surface having circumferentially running grooves therein;
   a conformable means for attaching said end turns to said inside surface;
   means for permitting relative motion between said end turns and said attaching means; and
   means for supporting said support member, said supporting means being disposed radially outward from said support member.

2. The system of claim 1, wherein:
   said conformable attaching means comprises a hollow woven rope having a resin material absorbed therein.

3. The system of claim 2, wherein:
   said hollow rope is associated with a plurality of fibers disposed therein.

4. The system of claim 3, wherein:
   said fibers include dacron and glass filaments.

5. The system of claim 1, wherein:
   said motion permitting means includes a layer of rubber and a layer of dacron cloth.

6. The system of claim 5, wherein:
   said rubber is attached to said end turn and said dacron cloth is attached to said conformable attaching means.

7. The system of claim 2, wherein:
   said resin is curable at room temperature.

8. A coil end turn support structure, said support structure comprising:
   a nonmagnetic member having an inside surface, said inside surface describing a frustum of a cone having a central axis and a first and second axial end, said inside surface being proximate and generally parallel with said end turn, said nonmagnetic member comprising a filament, said filament being wound around said nonmagnetic member circumferential to said central axis, said filament describing a spiral helix having a plurality of turns, each of said turns describing a preselected angle to said central axis, said preselected angle varying as a function of its axial position along said central axis, and a conformable member disposed between said end turn and said inside surface.

9. The structure of claim 8, wherein:
said inside surface has a plurality of grooves therein, said grooves being circumferential to said central axis.

10. The structure of claim 8, wherein:
said conformable member comprises a hollow rope, said rope being generally course grained.

11. The structure of claim 10, wherein:
a plurality of fibers are disposed within said hollow rope.

12. The structure of claim 10 or 11, further comprising:
a resin absorbed within said conformable member.

13. The structure of claim 12, wherein:
said resin is curable at room temperature.

14. The structure of claim 8, further comprising:
means for supporting said nonmagnetic member, said supporting means being disposed radially outward from said nonmagnetic member and connected thereto.

15. The structure of claim 14, further comprising:
at least one nonmagnetic connecting member extending from said nonmagnetic member to said supporting means.

16. The structure of claim 15, wherein:
said connecting member is a threaded stud extending into said nonmagnetic member and into said supporting means; and
said supporting means has a cavity into which said threaded stud extends.

17. The structure of claim 16, further comprising:
a threaded nut threaded onto said threaded stud, said nut being within said cavity.

18. The structure of claim 17, further comprising:
means for preventing said nut from being unthreaded from said stud.

19. The structure of claim 18, wherein:
said preventing means is a generally U-shaped member connected to said supporting means and passing over said nut.

20. The structure of claim 19, further comprising:
a plurality of fibers passing over a portion of said U-shaped member and through a hole in said supporting means.

* * * * *